… …

United States Patent [19]

Svoboda et al.

[11] 4,048,104

[45] Sept. 13, 1977

[54] POLYISOCYANATE PREPOLYMERS FROM SCRAP POLYESTER AND POLYURETHANE FOAM PRODUCTS OBTAINED THEREFROM

[75] Inventors: Glenn R. Svoboda, Grafton; John T. Suh, Mequon; William L. Carlstrom; Gary L. Maechtle, both of West Bend, all of Wis.

[73] Assignee: Freeman Chemical Corporation, Port Washington, Wis.

[21] Appl. No.: 711,831

[22] Filed: Aug. 5, 1976

[51] Int. Cl.$^2$ .................. C08G 18/14; C08G 63/76; C08J 11/04; C08G 18/10

[52] U.S. Cl. .................. 260/2.5 AN; 260/75 T; 260/75 NK; 260/75 NE; 260/2.3

[58] Field of Search ..... 260/2.5 AN, 75 NK, 75 NA, 260/75 NE, 2.3

[56] References Cited

U.S. PATENT DOCUMENTS

| | | | |
|---|---|---|---|
| 3,305,495 | 2/1967 | Vom Orde | 260/2.3 |
| 3,446,758 | 5/1969 | Wiener | 260/2.3 |
| 3,647,759 | 3/1972 | Walker | 260/2.5 AN |
| 3,699,082 | 10/1972 | Koerner et al. | 260/75 NK |

Primary Examiner—H.S. Cockeram
Attorney, Agent, or Firm—Harry B. Keck; George E. Manias

[57] ABSTRACT

Polyisocyanate prepolymers for use in preparing polyurethane products elastomers, adhesives and foams, are prepared by combining (1) organic polyisocyanate with (2) polyols which are the hydroxyl-terminated digestion products of (a) waste or scrap polyalkylene terephthalate polymers and (b) organic polyols. Polyurethane products resulting from the polyisocyanate prepolymers exhibit useful and unexpected properties.

14 Claims, No Drawings

POLYISOCYANATE PREPOLYMERS FROM SCRAP POLYESTER AND POLYURETHANE FOAM PRODUCTS OBTAINED THEREFROM

BACKGROUND OF THE INVENTION

1. Field of the Invention:

This invention relates to polyisocyanate prepolymers which are the reaction products of (1) organic polyisocyanate and (2) hydroxyl-terminated digestion products of (a) scrap or waste polyalkylene terephthalate polymers and (b) organic polyols.

2. Description of the Prior Art:

Polyalkylene terephthalate polymers are widely used as films and fibers. In general they have molecular weights greatly in excess of 15,000 and are sometimes referred to as super-polyesters. Numerous processes have been proposed for recovering useful products from waste or scrap polyalkylene terephthalate by depolymerizing or partially depolymerizing the polymer to lower molecular weight recurring structural units having the essential formula

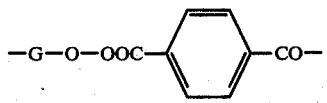

wherein —G— represents a divalent organic radical containing 2 to 10 carbon atoms attached to the adjacent oxygen atoms by saturated carbon atoms. In polyethylene terephthalate, G is —$C_2H_4$—. Super-polyesters have been digested primarily for reuse in the process of making additional super-polyesters, that is, the digestion products are reintroduced into the process from which they originated. Known digestion processes include treatment with caustic monohydric alcohol (U.S. Pat. No. 3,728,287); treatment with monohydric alcohol and ester interchange catalyst (U.S. Pat. No. 3,488,298); heating with glycols and vinyl acetate (U.S. Pat. No. 3,857,799); heating with bis ester solvents (U.S. Pat. No. 3,884,850); dissolving in ethylene glycol and/or terephthalic acid and/or dimethyl terephthalate (U.S. Pat. Nos. 3,907,868; 3,701,741; 3,703,488; 3,776,945; 3,257,335).

The concept of preparing polyurethane elastomers and polyurethane foam products by reaction of polyisocyanates with polyols is well developed.

SUMMARY OF THE INVENTION

The digested polyols obtained by digesting polyalkylene terephthalate polymers with lower molecular weight polyols might be employed as the polyol ingredient in a polyurethane foam product by reacting them with polyisocyanate prepolymers from other sources. However the digested polyol products are not compatible with halogenated blowing agents.

If the digested polyol product derived from polyalkylene terephthalate waste or scrap polymers is initially combined with an organic polyisocyanate to produce a polyisocyanate prepolymer, the prepolymer is miscible with halogenated blowing agents and can be combined with other polyols to produce flexible polyurethane foams.

Quite unexpectedly the strength properties of the resulting flexible polyurethane foams greatly exceed corresponding strength properties of flexible polyurethane foams prepared from similar ingredients. The resulting flexible polyurethane foams possess inherently lower cost because a substantial weight portion of the foam ingredients is waste or scrap polyalkylene terephthalate polymer, readily available at low prices. The improved strength properties of the flexible polyurethane foams make it particularly useful in the production of cushions and selfskinning furniture and automotive upholstering.

The present polyisocyanate prepolymers also are useful as an ingredient in the preparation of urethane elastomers and urethane coatings.

DESCRIPTION OF THE PREFERRED EMBODIMENT (S)

Polyalkylene terephthalate polymers and principally polyethylene terephthalate polymers are available in the form of photographic films and synthetic fibers which are employed in the fabrics industry. Waste films and fibers as well as scrap films and fibers are widely available. In addition polyalkylene terephthalate polymers are available as sludges which are obtained as cleanup by-products from polyalkylene terephthalate manufacturing plants. In all cases the polyalkylene terephthalate contains recurring units of

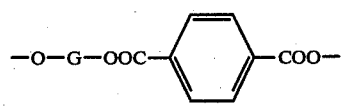

wherein G represents a divalent organic radical containing from 2 to 10 carbon atoms attached to the adjacent oxygen atoms by saturated carbon atoms. The molecular weight of such polyalkylene terephthalic polymers is greater than 15,000 frequently greater than 100,000. According to the present invention such polyalkylene terephthalic polymers are digested with low molecular weight polyols selected from the class consisting of diols and triols. Typical diols include ethylene glycol, propylene glycol, butylene glycol, diethylene glycol, polyethylene glycol, dipropylene glycol, polypropylene glycol, other alkylene glycols and glycol ethers, hydroxy-terminated polyesters, bis(2-hydroxyethoxy-ethyl)-glutarate, bis(2-hydroxy ethyl)terephthalate, and in general any hydroxy-terminated ether, ester or mixed etherester having a molecular weight of 500 or less. The digesting polyol can be aliphatic or aromatic. The digesting polyol may include substituents which are inert in the digestion reaction, for example, chlorine, bromine substituents.

In general the polyalkylene terephthalic polymer is digested by heating the polymer at temperatures from about 200°–250° C for several hours with the selected digesting polyol solvent. The digestion is carried out in a nitrogen atmosphere to minimize oxidation reactions. Periodically samples are taken from the digestion kettle and deposited in acetone at room temperature. The digestion is considered to be complete when the sample digested product is completely soluble in the acetone. After completion of the digestion the reaction kettle contents are allowed to cool and may be used directly or may be stored in suitable containers such as metal cans.

The polyisocyanate prepolymers are prepared from any suitable organic polyisocyanate, for example, toluene diisocyanate, polymethylene polyphenyl polyisocyanates, aliphatic polyisocyanates. In the preferred method of making the polyisocyanate prepolymer from the digestion product, the selected polyisocyanate is heated to about 90° F and the digestion product is added in increments to maintain a temperature below about 180° F. After all of the digestion products has been added to the selected polyisocyanate, the reaction vessel is heated at about 180° F for about one hour; thereafter cooled to room temperature. The contents are checked for —NCO value and viscosity and used directly or stored in suitable containers such as metal cans. The prepolymer is substantially free of unreacted hydroxyl radicals.

EXAMPLES

I. Examples of Preparation of Digestion Product

The examples in this specification employ as a starting material recovered photographic film chips consisting essentially of polyethylene terephthalate in small flakes from about 1/16 to about ¼ inch major dimension. Such flakes are the residue of silver salt recovery processes carried out on waste or recovered photographic film. The flakes are available as clear chips, as blue chips (containing a blue dye) and as black chips (containing carbon black).

EXAMPLE 1

Mixed ether-ester triol as digesting polyol

A commercially available mixed ether-ester triol was selected as a digesting polyol. The triol has a molecular weight of about 400 and is hydrophobic. Its viscosity is less than 5300 cp; hence, the material flows readily at room temperatures. It is available commercially as Urol-11 (a trademark of U.C.T. Corporation) for use as an inexpensive polyol ingredient for polyurethane manufacture. 520 grams of the triol were combined with 768 grams polyethylene terephthalate chips. The mixture was heated at about 245° C for three hours. At that stage the reaction vessel contents were soluble in acetone. The reaction vessel contents were cooled to 200° C and transferred to metal cans. The product had a hydroxyl number of 175 and a molecular weight of approximately 976. At room temperature the material was a solid. The molar ratio of the triol to ethylene terephthalate units in this example was 0.33:1.

EXAMPLE 2

Mixed ether-ester triol as digesting polyol

The process of Example 1 was repeated except that the molar ratio of triol to units of ethylene terephthalate in the chips was 0.5:1. Specifically 1560 grams of the triol and 2304 grams of the polymer chips were digested to produce a polyol having a molecular weight approximately 781 and a hydroxyl number of 215. The material was a solid at room temperature.

EXAMPLE 3

Mixed ether-ester triol as digesting polyol

Example 1 was repeated except that the molar ratio of triol to units of ethylene terephthalate was 1:1. Specifically 1560 grams of the triol was combined with 764 grams of the film chips. The resulting digestion product was a semiliquid having a hydroxyl number of 272 and a molecular weight of about 592.

EXAMPLE 4

Diethylene glycol as the digesting polyol

Example 1 was repeated except that diethylene glycol was employed as the digesting polyol. The molar ratio of diol to units of ethylene terephthalate was 1:1. 1272 grams diethylene glycol was combined with 2304 grams of the photographic film chips. The resulting digestion product was a semiliquid having a hydroxyl number of 367 and molecular weight of about 298.

EXAMPLE 5

Polyethylene glycol as a digesting polyol

Example 1 was repeated except that the digesting polyol was polyethylene glycol having a molecular weight of about 200. 2188 grams of the polyethylene glycol was combined with 2001 grams of the photographic film chips. The molar ratio of glycol to units of ethylene terephthalate was 1:1. The resulting digestion product was a semiliquid having a hydroxyl value of 273 and a molecular weight of about 402.

EXAMPLE 6

Polypropylene glycol as a digesting polyol

Example 1 was repeated except that the digesting polyol was polypropylene glycol having a molecular weight of about 400. The molar ratio of glycol to units of ethylene terephthalate was 1:1. 3444 grams of the polypropylene glycol were combined with 1556 grams of photographic film chips. Also 5 grams of tetraoctyl titanate and a few drops of Dow Corning Antifoam was added to the digestion kettle. The digestion product was a semiliquid having a hydroxyl value of 186 and a molecular weight of about 617.

EXAMPLE 7

Bis(2-hydroxy-ethoxy-ethyl)glutarate as a digesting polyol

Bis(2-hydroxy-ethoxy-ethyl)glutarate was prepared by cooking together 2 mols diethylene glycol and 1 mol dimethyl glutarate for about 16 hours at 150°-225° C. A small quantity of tetra octyl titanate was included as a transesterification catalyst. Methanol was recovered overhead and the resulting bis(2-hydroxy-ethoxy-ethyl)glutarate had a hydroxyl number of 327, a viscosity of 210 centipoises at 25° C. This bis(2-hydroxy-ethoxy-ethyl)glutarate was combined with photographic film chips on a ratio of 1 mol glutarate to 1 unit of ethylene terephthalate. Specifically 1282.5 grams of the bis(2-hydroxy-ethoxy-ethyl)glutarate was combined with 717 grams photographic film chips in the manner described in Example 1. The resulting digestion product was a semiliquid having a hydroxyl value of 219 and a molecular weight of about 496.

EXAMPLE 8

Diethylene glycol as a digesting polyol

Example 1 was repeated except that diethylene glycol was employed as the digesting polyol in a ratio of 0.5 mol diethylene glyocl for each repeating unit of ethylene terephthalate. 796 grams diethylene glycol and 2880 grams of film chips were combined and processed to produce a digestion product which was a solid at room temperature and had a hydroxyl value of 199 and a molecular weight of about 480.

EXAMPLE 9

Dipropylene glycol as a digesting polyol

Example 1 was repeated except that the digesting polyol was dipropylene glycol in a ratio of 1 mol for each unit of ethylene terephthalate. 1610 grams dipropylene glycol and 2304 grams photographic film chips were combined and treated as in Example 1 to produce a digestion product in the form of a soft solid having a hydroxyl value of 329 and a molecular weight of about 326.

II. Examples of the Preparation of Polyisocyanate Prepolymers

Some of the digestion products described in Examples 1-9 were prepared as polyisocyanate prepolymers employing toluene diisocyanate (80/20 mixture) as the organic polyisocyanate. The proportions and properties of the resulting polyisocyanate prepolymer are set forth in the following Table I.

TABLE I

| Example | Digestion Product | Wt. TDI (80/20) P.B.W. | Wt. Digestion Product P.B.W. | Prepolymer −NCO Value % | Viscosity cp. at 25° C |
|---|---|---|---|---|---|
| (4-a) | Ex. 4 | 80 | 20 | 33 | 125 |
| (5-a) | Ex. 5 | 80 | 20 | 35 | 50 |
| (7-a) | Ex. 7 | 70 | 30 | 29 | 300 |
| (7-b) | Ex. 7 | 80 | 20 | 35 | 50 |
| (7-c) | Ex. 7 | 87 | 13 | 40 | 50 |

Flexible polyurethane foam products can be prepared from the polyisocyanate prepolymers of this invention along with any polyol (diol or triols preferred) having a molecular weight of 1,000-6,5000 and a suitable blowing agent, cell control agent and catalyst. Preferably the blowing agent is (a) water or (b) water and a halogenated blowing agent such as methylene chloride or halogenated alkanes. The cell control agent customarily is a silicone surfactant. The catalyst normally is any polyurethane catalyst such as an amine or an organometallic catalyst. The ingredients are mixed together and allowed to cure in a mold or by free rise processes. Customarily all of the ingredients except the polyisocyanate prepolymer are premixed together. Other polyisocyanates also may be included to achieve desired properties in the final product.

A typical commercially available flexible polyurethane foam system is available from Mobay Chemical under the trademark Bayfit 550. The Bayfit 550 system includes an A and B ingredient. The A ingredient consists of a polyisocyanate prepolymer which is the reaction product of polyether polyol and toluene diisocyanate. The B ingredient includes a 6,000 molecular weight triol, a mixed catalyst, water and a cell control agent, believed to be a silicone surfactant. The A and B ingredients are mixed and allowed to foam as a flexible foam in a stoichiometric proportion such that substantially no unreacted isocyanate groups remain in the product. The physical properties of the Bayfit 550 system are set forth in Table II.

In order to evaluate the present polyurethane foam systems, a modified Bayfit 550 B ingredient was prepared by taking the commercially available B ingredient and adding 0.75 percent by weight of a urethane foam catalyst (a 33% by weight solution of triethylene diamine in glycol). The incremental catalyst did not alter the stoichiometry of the commercially available Bayfit 550 system. A modified Bayfit 550 polyurethane foam product was prepared from the commercially available A ingredient and the modified B ingredient. The properties of the modified Bayfit 550 foam are set forth in Table II.

EXAMPLES 10-14

Flexible polyurethane foams were prepared by combining 100 parts by weight of the modified B polyol and the present polyisocyanate prepolymers as shown in the following Table I:

Table I

| 100 parts by weight Modified BAYFIT 550 Polyol "B" | | |
|---|---|---|
| Example | Weight of Prepolymer | Prepolymer |
| 10 | 41 | 4-a |
| 11 | 39.5 | 5-a |
| 12 | 47 | 7-a |
| 13 | 38.6 | 7-b |
| 14 | 34 | 7-c |

The properties of the resulting flexible polyurethane foams are included in Table II.

TABLE II

| PROPERTIES OF FLEXIBLE FOAMS | | | | | | | |
|---|---|---|---|---|---|---|---|
| FOAM | BAYFIT 550 | MODIFIED BAYFIT 550 | Ex. 10 | Ex. 11 | Ex. 12 | Ex. 13 | Ex. 14 |
| Density, p.c.f. | 2.27 | 2.17 | 2.34 | 2.24 | 3.05 | 2.35 | 2.50 |
| Compression Set, % | | | | | | | |
| 50% | 6.8 | 6.4 | 11.4 | 7.5 | 21.7 | 5.5 | 6.7 |
| Humid Aged | 10.3 | 10.6 | 12.1 | 10.2 | 6.0 | 5.73 | 6.0 |
| 90% | FAIL | FAIL | FAIL | FAIL | FAIL | 8.45 | FAIL |
| Humid Aged | 10.9 | 13.0 | 23.6 | 13.6 | 7.8 | 7.2 | 7.4 |
| Tensile Strength, psi | | | | | | | |
| Original | 8.8 | 9.6 | 18.8 | 13.1 | 16.2 | 18.4 | 18.5 |
| Humid Aged | 15.6 | 16.3 | 21.2 | 22.6 | 16.2 | 23.1 | 23.8 |
| Tear Strength, p.c.i. | 1.4 | 1.1 | 3.8 | 2.1 | 3.7 | 3.0 | 3.5 |
| Elongation, % | | | | | | | |
| Original | 159 | 166 | 361 | 203 | 481 | 260 | 321 |
| Humid Aged | 299 | 345 | 430 | 397 | 407 | 452 | 449 |
| Indentation Load Deflection (I.L.D.) | | | | | | | |
| 25% | 17 | 15 | 25 | 24.5 | 18.7 | 30 | 28 |
| 65% | 42 | 38 | 60 | 57 | 45 | 64 | 65 |
| % 25% R | 82 | 80 | 76 | 78 | 75 | 75 | 75 |
| S.A.G. | 2.47 | 2.53 | 2.40 | 2.33 | 2.41 | 2.13 | 2.32 |

It will be observed from TABLE II that the flexible polyurethane foams of Examples 10, 11, 12, 13 and 14 exhibit improved tensile strength and tear strength when compared with the commercially available Bayfit 550 product and when compared with the modified Bayfit 550 product. Moreover the polyurethane foams of Examples 10, 11, 12, 13 and 14 exhibit improved elongation and improved I.L.D. values when compared with the commercially available Bayfit 550 foam and the modified Bayfit 550 foam. The reported properties are of commercial significance in the cushion foam and furniture foam industries. In essence the only difference between Examples 10, 11, 12, 13 and 14 on the one hand and the modified Bayfit 550 system on the other hand is the employment of polyisocyanate prepolymers prepared in accordance with the present invention.

The Indentation Load Deflection values are determined by compressing a specimen to 75% of its original thickness; then compressing the specimen to 35% of its orginal thickness; and thereafter allowing the specimen to expand to 75% of its original thickness. The weight required to achieve the required compressions is recorded. The weight required to restore the 75% thickness is recorded as a percentage of the original weight required to achieve a 25% thickness reduction, the "%-25% R". The S.A.G. value is the numerical ratio of the 65% compression weight to the initial 25% compression weight.

We claim:

1. The method of preparing a polyisocyanate prepolymer comprising
   A. Digesting polyalkylene terephthalate having a molecular weight greater than 15,000 in a reactive solvent selected from the class consisting of organic diols and triols having a molecular weight from 62 to 500 until the digestion product is soluble in acetone at room temperature;
   B. Reacting the said digestion product with an organic polyisocyanate to produce a polyisocyanate-terminated prepolymer substantially free of unreacted hydroxyl radicals.
2. The method of claim 1 wherein the said polyalkylene terephthalate is polyethylene terephthalate.
3. The method of claim 1 wherein the said reactive solvent is polypropylene glycol.
4. The method of claim 1 wherein the said reactive solvent is polyethylene glycol.
5. The method of claim 1 wherein the said reactive solvent is bis(2-hydroxy-ethoxy-ethyl)glutarate.
6. The method of claim 1 wherein the said reactive solvent is diethylene glycol.
7. The method of claim 1 wherein the said reactive solvent is dipropylene glycol.
8. The method of claim 1 wherein the said reactive solvent is mixed ether-ester triol having a molecular weight of less than 500.
9. The method of claim 1 wherein the said organic polyisocyanate is toluene diisocyanate.
10. The method of preparing a polyurethane product comprising mixing together under reactive conditions:
    A. The polyisocyanate prepolymer of claim 1;
    B. An organic polyol;
    C. A catalyst for the reaction of hydroxy and isocyanate radicals.
11. The method of claim 10 wherein the said organic polyol is a polyether polyol.
12. The method of claim 11 wherein the said polyether polyol has a molecular weight of 1,000 to 6,500.
13. A polyisocyanate prepolymer prepared according to claim 1.
14. A polyurethane foam prepared by adding a blowing agent to the ingredients recited in claim 11 prior to carrying out the method.

* * * * *